Patented Dec. 28, 1926.

1,612,103

UNITED STATES PATENT OFFICE.

WILHELM ECKERT, OF HOCHST-ON-THE-MAIN, GERMANY, ASSIGNOR TO GRASSELLI DYESTUFFS CORPORATION, OF NEW YORK, N. Y., A CORPORATION.

PROCESS FOR PREPARING 1-4-5-8 NAPHTHALENE TETRACARBOXYLIC ACID.

No Drawing.   Application filed August 31, 1925.   Serial No. 53,735.

The 1.4.5.8-naphthalenetetracarboxylic acid has for the first time been prepared by Bamberger and Philip (see Liebig's Annalen vol. 240 page 182) from pyrenic acid by oxidation, a method which, however, offers no technical interest owing to the fact that the said pyrenic acid is scarcely obtainable.

Furthermore the said acid has been obtained in a very intricate manner by Freund and Fleischer (see Liebig's Annalen vol. 373 page 322/24 and vol. 402 page 70/74) by condensing acenaphthene with diethylmalonylchloride, extracting with ether, isolating the isomerides formed during this condensation, splitting up the acenaphthene-diethyl-peri-indandion by boiling with potassium hydroxide solution of 50% strength, converting the resulting potassium salt of the 4-diethyl-acetyl-1,8-acenaphthene-5-carboxylic acid into its free acid and finally oxidizing the acid.

Now I have found that when using malonylchloride there is apparently only formed the peri-acenaphthenindandion of the formula:

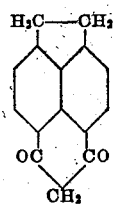

and that this compound can be directly oxidized by an oxidizing agent to the naphthalene-1.4.5.8-tetracarboxylic acid.

This new process represents a considerable simplification which is particularly due to the surprising fact that the indandion-ring must not be split open in order to permit the oxidation.

The said acid is a useful starting material for the manufacture of dyestuffs.

In an analogous manner the derivatives of acenaphthene with a free peri position can be converted into the corresponding derivatives of the naphthalenetetracarboxylic acid.

The following example illustrates my invention, the parts being by weight:

20 parts of acenaphthene are dissolved in 200 parts of carbon disulfide whereupon 30 parts of malonylchloride are added. Afterwards 35 parts of aluminium chloride are gradually introduced. The reaction, which sets in vehemently, is advantageously somewhat moderated by cooling. When the formation of hydrogen chloride has ceased, the mass is further heated for a short time on the steam bath in order to complete the reaction. The product resulting from the reaction is decomposed with ice, distilled with steam and directly dissolved in a diluted solution of sodium carbonate or a caustic soda solution. A solution of 50 parts of potassium permanganate in 1000 parts of water is added to this alkaline solution and the whole is heated on the steam bath until decoloration occurs. The manganese dioxide is then filtered off and the naphthalene-1.4.-5.8-tetracarboxylic acid is precipitated in the filtrate by means of hydrochloric acid.

The structural formulæ of the intermediate and final products may be represented as follows:

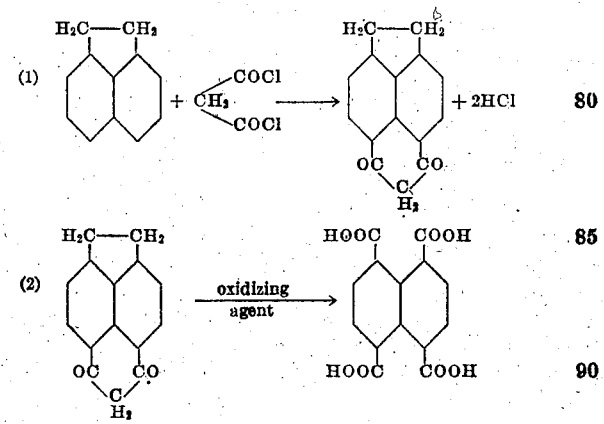

If a greater excess of malonylchloride, for instance 60—80 parts and correspondingly 70 to 90 parts of aluminium-chloride and about 70 parts of potassium permanganate are employed, the yield is essentially greater.

Instead of the carbon disulfide there may also be used other indifferent solvents and instead of potassium permanganate any other oxidizing agent.

I claim:

Process of producing naphthalene-1.4.5.8-tetracarboxylic acid consisting in condensing acenaphthene with a malonylchloride and oxidizing the product of reaction.

In testimony whereof, I affix my signature.

DR. WILHELM ECKERT.